Nov. 25, 1952        T. E. SMITH        2,619,207
BRAKE RELEASE MECHANISM
Filed March 28, 1951
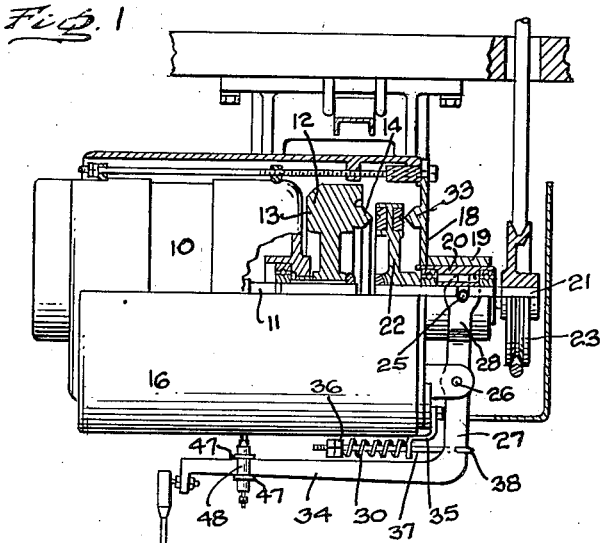
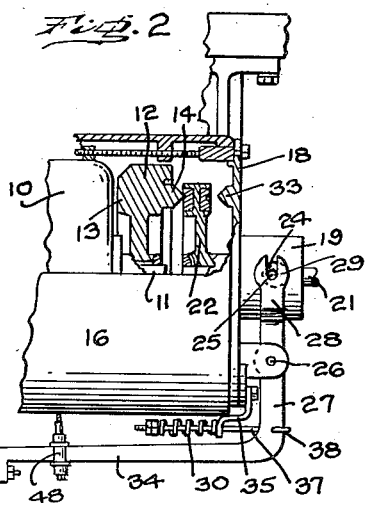
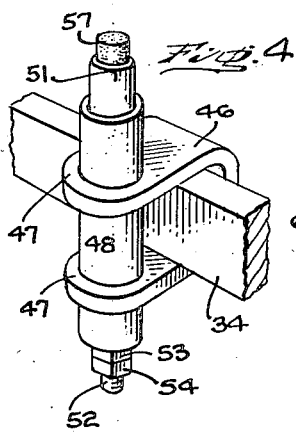
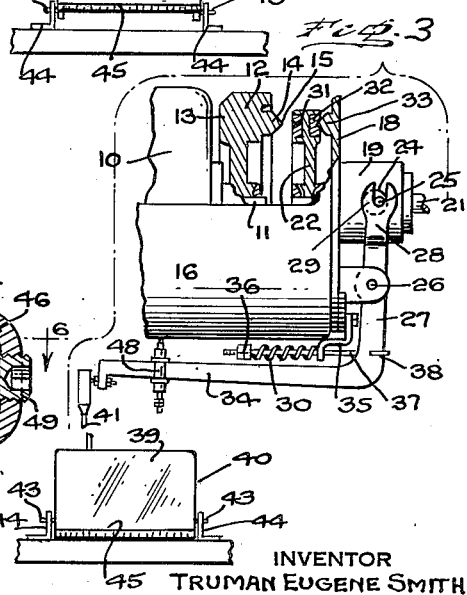
INVENTOR
TRUMAN EUGENE SMITH
BY *Leon Edelson*
ATTORNEY Patented Nov. 25, 1952

2,619,207

UNITED STATES PATENT OFFICE 2,619,207

BRAKE RELEASE MECHANISM

Truman Eugene Smith, Mohnton, Pa., assignor to American Safety Table Co., Inc., Reading, Pa., a corporation of Pennsylvania Application March 28, 1951, Serial No. 218,041

8 Claims. (Cl. 192—18)

This invention relates generally to apparatus for the transmission of power from a continuously operating motor mechanism to a machine adapted for intermittent operation, and more particularly to an improved construction of brake release mechanism.

Among the principal objects of the present invention is to provide a simple and rugged motor drive organization in which a motor-driven shaft may operate continuously in association with a combined clutch and brake element for the intermittent transmission of power to a unit, such as a sewing machine or the life, and for the effective braking of the unit when it is disconnected from the motor.

Another object of the invention is to provide a drive organization of the type described which, while the motor-driven shaft is running continuously, permits such disconnection of the driven unit from the driving organization as will make it possible to either retain the unit braked or freely operable by hand for such adjustments of the work as may be found necessary.

Still another object of the invention is to provide a motor drive organization for a sewing machine unit or the like wherein a combined clutch and brake element are under selective control by the operator for either connecting the unit to the continuously running motor or for disconnecting it therefrom and from its brake so that it can then be freely turned by hand for such adjustments of the unit as may be necessary.

Other objects and advantages of the present invention will appear more fully hereinafter, it being understood that the invention consists substantially in the combination, construction, location and relative arrangement of parts, all as described in detail hereinafter, as shown in the accompanying drawings and as finally pointed out in the appended claims.

In the accompanying drawings which illustrate an apparatus embodying one form of the present invention:

Figure 1 represents a side elevation partly broken away, of the apparatus as operatively mounted on the underside of a table adapted to support a sewing machine or the like, and showing the clutch in neutral position;

Figure 2 is a fragmentary view similar to Figure 1, showing the clutch in driving position;

Figure 3 is a view similar to Figure 2 showing the clutch in braking position;

Figure 4 is a perspective of a preferred form of the clutch control unit of the present invention;

Figure 5 is a section taken axially of the unit of Figure 4; and

Figure 6 is a sectional detail on line 6—6 of Figure 5.

Referring to the drawings and more particularly to Figures 1, 2, and 3 thereof, it will be observed that the present invention is shown incorporated in an individual drive organization for a work utility, such as a sewing machine, said organization including an electric motor 10, the shaft 11 of which is extended to receive thereon a flywheel 12 suitably keyed or locked to the motor shaft for rotation therewith. Formed upon the face of the flywheel 12 immediately adjacent to the motor 10 are a plurality of circumferentially spaced radial vanes 13 which force cooling air over the peripheral surface of the motor during operation thereof. Formed upon the opposite or outer face of the flywheel is an annular rib 14 of generally triangular shape in transverse cross section to provide it with a relatively sharp outer edge 15.

The motor 10 and its associate flywheel 12 are mounted as an assembly within a supporting housing 16 of generally cylindrical shape, this housing 16 being of a length somewhat greater than the over-all length of the motor and flywheel assembly. Suitable provision is made for clamping the motor and housing together, as well as for axially adjusting their positional relationship to present the flywheel 12 in proper operative relation to the clutch and brake assembly hereinafter referred to.

Suitably secured to the rear end of the housing 16 is a centrally apertured end plate 18 from which rearwardly projects a cylindrical journal box 19. Slidably fitted within this journal box 19 is a ball-bearing assembly 20 within which is rotatably journalled a shaft 21 to the oppositely projected ends of which are respectively secured a clutch disc 22 and a belt pulley 23. The journal box or housing for the ball-bearing assembly is provided at diametrically opposite sides thereof with openings 24—24 through which respectively projects a pair of studs 25—25 suitably secured to opposite sides of the external sleeve 19 of said ball-bearing assembly 20. It will be understood, of course, that the clutch disc 22 and the belt pulley 23 are each nonrotatably secured to the shaft 21 for rotation therewith and that the said clutch disc, belt pulley, shaft 21 and the ball-bearing assembly are axially shiftable as a unit within the relatively stationary journal box or housing 19 by the means presently to be described.

Pivotably secured to the end plate 18 of the motor housing 16, at as 26, is a clutch-actuating lever 27, this lever being provided at its upper end with a bifurcated yoke portion 28 having laterally spaced arms adapted to straddle therebetween the journal box 19, these arms being each provided with a forked terminal end 29 for engagement respectively with the studs 25 projecting outwardly through the openings 24 in the side wall of the journal box. The lever 27 is under the influence of a compression spring 30 which normally biases the lever to shift the clutch disc 22 to the position shown in Figure 3, in which position the clutch disc 22 is disengaged from the flywheel of the motor 10.

As most clearly appears in Figures 1, 2, and 3, the clutch disc 22 is provided adjacent its perimetral edge with a pair of oppositely facing annular friction discs 31 and 32 of cork or other suitable resilient material, the disc 31 being adapted to engage the annular rib 14 of the motor flywheel 12 while the disc 32 is adapted to engage an annular rib 33 formed upon the inner face of the end plate 18 of the motor housing 16. The annular rib 33 is similar to the annular rib 14 in that it also is of generally triangular shape in transverse cross-section to provide it with a relatively sharp outer edge.

For shifting the clutch 22, the shift lever 27 is in the form of a bell-crank having one arm 34 extending below the housing 16 and longitudinally thereof with such clearance as will permit proper operating swing of the lever 27. Normally the clutch 22 is biased toward its braking position by the compression spring 30 which is compressed between a bracket 35 fixed to the housing 16 and nuts 36 threaded on the outer end of a rod 37, which slides freely through the bracket 35 and is hooked to the lever 27, as at 38. The biasing pressure of the spring 30 is arranged to be overcome by the pressure of the operator's foot on the toe portion 39 of a pivotally mounted treadle 40 to transmit motion thereof through a rod 41 to the arm 34 of the lever 27.

When the operator presses down upon the toe portion of the treadle 40 with sufficient pressure to overcome the biasing pressure of the spring 30, the lever 27 is moved counter-clockwise, and shifts the combined clutch and brake member 22 into driven contact with the flywheel rib 14 so that motion is then transmitted from the motor to the sewing machine. The treadle 40 which is pivotally mounted upon pivot pins 43—43 supported respectively in brackets 44—44 fixed to the floor as will be understood, is provided with a heel portion 45 which projects forwardly of the transverse line of the pivot pins 43—43 and is adapted to be engaged by the heel of the operator's foot. Thus, the rocking of the operator's foot upon the treadle 40 controls the action of the shift lever 27, since depression of the toe portion 39 of the treadle moves the clutch 22 to motion-transmitting position, while depression of the heel portion 45 of the treadle moves the clutch 22 to braking position.

In many instances it is desirable to so disconnect the work utility from the running motor assembly as to leave the unit free for hand manipulation, such as for adjusting the work or the machine unit or for other purposes, and to that end the invention comprehends a novel means for maintaining the clutch 22 in neutral position, so that it neither contacts the driven flywheel 12 of the motor or the stationary breaking element 33. This novel means, in the present instance, comprises a brake release mechanism which includes a clevis 46 adjustably mounted upon the lever arm 34 in such straddling relation thereto as will locate its apertured ears 47—47 in vertical alignment to receive a cylindrical plunger-retaining member 48, which is held fast between the clevis 46 and the lever arm 34 by means of a set screw 49. It will be apparent that as the set screw 49 is axially projected against the lever arm 34, the clevis 46 is drawn outwardly of the lever arm to frictionally clamp the member 48 against the latter. By loosening the set screw 49 the clevis 46 and the member 48 may be moved as a unit along the lever arm 34 to a position for the required leverage as will later appear. Additional set screws 50 may also be used to ensure a fixed position of the clevis upon the lever arm.

The member 48 is longitudinally bored to receive a plunger 51 which projects through one end of the member 48 and has its inner end threaded upon a threaded stem 52 axially disposed in the member 48 and projecting through a reduced diameter opening in the lower end of the member 48. The projecting end of the stem 52 carries a nut 53 bearing against the end of the member 48, the nut 53 being locked in its adjusted position by a lock nut 54. A coil spring 55 embraces the stem 52, its compression effort between the plunger 51 and the shoulder 56 formed by the reduced bore in the lower end of the member 48 being adjusted by the nut 53. The projecting end of the plunger 51 mounts a cushioning block 57 for contact with the bottom portion of the housing 16 to limit the permissible upward throw of the lever arm 34. To properly locate the brake release mechanism relatively to its supporting lever and to adjust the plunger 51 for proper compressive effort of its spring in opposition to the main spring 30 acting upon the lever 27, the plunger cylinder 48 may be axially shifted relatively to its clamping clevis 46 and the lever arm 34 by loosening the set screw 49 and then re-tightening it to secure the plunger assembly in its adjusted position.

From the foregoing, it will be seen that the member 48, the spring pressed plunger 51 and their associated parts provide a control assembly for the operation of the shift lever 27 and the several functions incident thereto. The operation is as follows:

For maintaining the clutch member 22 in neutral position the clevis 46 is set upon the lever arm 34 for a selected leverage and the member 48 is then so adjusted, preferably by axial shifting of the member 48 relatively to its supporting clevis, as to provide a normal bias to the spring-pressed plunger 51 that will just over-balance the action of the spring 30 when the plunger 51 through its cushioning block 57 is pressed against the housing 16. This over-balance is such as to locate the clutch member 22 normally in a neutral position, that is, out of engagement with both the driven flywheel 12 and the brake 33. When this adjustment is made to locate the clutch 22 in neutral position, the treadle 40 is in an inclined position with its toe portion 39 raised above and its heel portion 45 depressed below the pivotal axis of the treadle, in which condition of the parts the apparatus is ready for operation and control by the operator. To transmit motion from the continuously running motor 10 to the sewing machine, the operator depresses by his toe, the toe portion of the treadle to pull the rod 41 down, whereupon the shift lever 27 is moved counter-clockwise, into its position shown in Figure 2, so that the clutch member 22 is shifted into frictional engagement with the flywheel 12, motion being then transmitted through the shaft 21 to the pulley 23. In so activating the sewing machine or other utility operated by the motor, it is only necessary to overcome the resistance afforded by the spring 30, it being apparent that when the lever 27 is shifted counterclockwise, the spring 55 interposes no resistance to such movement.

When it is desired to stop the sewing machine, the operator depresses, by his heel, the heel portion 45 of the treadle 40 to thereby thrust the rod 41 upwardly and so cause the lever 27 to shift clockwise against the normal bias of the spring 50, this clockwise shifting of the lever being assisted by the normal bias of the spring 30. It will be apparent that by exerting sufficient heel pressure upon the treadle to overcome the resisting differential bias of the opposed springs 30 and 55, the clutch member 22 may be brought into braking engagement with the stationary braking member 33. While this interrupts operation of the driven machine, it does not permit free turning of the latter by hand for such adjustments thereof as may be necessary.

When such free operation of the driven machine is desired, it is merely necessary for the operator to completely remove his foot from the treadle, whereupon the predominant predeterminedly set pressure of the spring 50, acting through the cushioning block 51 against the motor housing, swings the shift lever against the opposing pressure of the spring 30 to locate and maintain the clutch 22 in its neutral position shown in Figure 1. Thus, the sewing machine is then disconnected both from the motor drive and from the brake and can be freely operated by hand for such adjustment of the machine and the work as may be required.

Automatic stopping of the work utility closely followed by automatic release of the latter from its braked condition may be effected simply upon complete removal of the operator's foot from the treadle, "heeling" of the latter, as above described, being unnecessary except when it is desired to release the work utility for manual adjustment thereof simultaneously as it is stopped. Thus, assuming the treadle to be depressed by the operator's toe, upon complete release of the treadle the spring 30 immediately becomes operative to throw the lever 27 into braking position (Figure 3), the energy of the spring 30 being momentarily sufficient to overcome the opposing effort of the plunger spring 55, in consequence of which operation of the work utility is interrupted. Thereafter, the plunger spring 55, acts upon the plunger 51 to overcome the braking effort of the spring 30 upon the lever 27 and causes the latter to shift from its braking position (Figure 3) into its neutral position (Figure 1), to thereby release the work utility for such adjustment thereof as may be necessary.

While the present invention has been illustrated as applied to an individual motor drive organization of the type shown and described herein, it will be understood that it is equally applicable to other motor drive organizations, such as the multiple drive transmission unit illustrated in United States Patent No. 2,037,643, of April 14, 1936, wherein a single motor drives a shaft to which a plurality of work utilities may be operatively connected. In the case of such multiple drive unit the brake release mechanism of the present invention is so mounted upon the operating lever for each utility as to engage a stationary part of the utility drive mechanism which includes the clutch and brake elements, the engagement being such as to resiliently maintain the clutch lever in its neutral position when the treadle for actuating the operating lever is in its normal (i. e. not depressed) position.

It will be understood, of course, that the present invention is susceptible of various changes and modifications which may be made from time to time without departing from the general principles or real spirit thereof, and it is accordingly intended to claim the same broadly, as well as specifically, as indicated in the appended claims.

What is claimed as new and useful is:

1. In an electric power transmission apparatus, an electric motor, a clutch element operated by said motor, a fixed braking plate, means supporting said plate juxtaposed to but spaced from said clutch element, a clutch disc interposed between said element and said plate and out of contact with both, means including a rotatable shaft in axial alinement with the axis of rotation of said motor for supporting said disc, said rotatable shaft being axially shiftable to move said disc in one direction to engage said clutch element and in the opposite direction to engage said braking plate, means including a pivoted lever for shifting said shaft, spring means biasing said lever to shift said shaft to cause said clutch disc to engage said braking disc, supplemental spring means acting on said lever in opposition to said biasing spring means to normally position said clutch disc out of engagement with both said clutch element and said braking plate, and manually operated means operative to overcome the action of said supplemental means and effect shifting of said clutch disc into engagement with said braking plate.

2. An electric power transmission apparatus, an electric motor, a clutch element operated by said motor, a fixed braking plate, means supporting said plate juxtaposed to but spaced from said clutch element, a clutch disc interposed between said element and said plate, means including a rotatable shaft in axial alinement with the axis of rotation of said motor for supporting said disc, means axially shiftable to move said disc in one direction to engage said clutch element and in the opposite direction to engage said braking plate, said last-mentioned means including a pivoted lever, spring means biasing said lever and operative to cause said clutch disc to engage said braking disc, supplemental spring means acting on said lever in opposition to said biasing spring means to normally position said clutch disc out of engagement with both said clutch element and said braking plate, and manually operated means coacting with said supplemental means to render said biasing means ineffective, whereby said clutch disc is shifted into engagement with said clutch element.

3. In an electric power transmission apparatus, an electric motor, a clutch element operated by said motor, a fixed braking plate, means supporting said plate juxtaposed to but spaced from said clutch element, a clutch disc interposed between said elements, a clutch plate, means including a rotatable shaft in axial alinement with the axis of rotation of said motor for supporting said disc, means axially shiftable to move said disc in one direction to engage said clutch element and in the opposite direction to engage said braking plate, said last-mentioned means including a pivoted lever, spring means biasing said lever and operative to cause said clutch disc to engage said braking disc, supplemental spring means acting on said lever in opposition to said biasing spring means to normally position said clutch disc out of engagement with both said clutch element and said braking plate, and manually operated means for selectively controlling the operation of said biasing means and said supplemental means, whereby said clutch disc can be shifted in either direction at will.

4. In an electric power transmitting apparatus, a revoluble clutch element, a fixed braking element axially spaced from said clutch element, a mounting for said braking element, a revoluble clutch disc interposed between said clutch and braking elements, means including a rotatable shaft in axial alinement with the axis of rotation of said clutch element and clutch disc for supporting said disc, means axially shiftable to move said disc in one direction to engage said clutch element and in the opposite direction to engage said braking element, said last-mentioned means including a pivoted bell crank lever, means including a spring acting against said lever to bias said clutch disc toward said braking element, supplemental spring means operative between said lever and said mounting for the fixed braking element to neutralize said biasing spring means, and manually operable means operative selectively to overcome the normal bias of said supplemental spring means and to render ineffective its neutralizing action on said biasing spring means.

5. An electric power transmitting apparatus in accordance with claim 4 wherein the supplemental spring means comprise a spring-pressed plunger to contact said mounting, and a plunger-retaining element mounted on the bell crank lever.

6. An electric power transmitting apparatus in accordance with claim 5 wherein means are provided for varying the spring pressure of the plunger.

7. An electric power transmitting apparatus in accordance with claim 5 wherein the retaining element is adjustable on said lever to vary the operating leverage according to requirements.

8. An electric power transmitting apparatus in accordance with claim 5 wherein a foot treadle is connected to the bell crank for control purposes.

TRUMAN EUGENE SMITH

REFERENCES CITED

The following references are of record in the file of this patent:

FOREIGN PATENTS

| Number | Country | Date |
|---|---|---|
| 221,332 | Great Britain | Sept. 11, 1924 |